United States Patent [19]
Müller

[11] Patent Number: 6,011,077
[45] Date of Patent: Jan. 4, 2000

[54] CROSSLINKABLE POLYMERS CONTAINING BONDED PHOTOINITIATORS

[75] Inventor: Beat Müller, Marly, Switzerland

[73] Assignee: Novartis AG, Basel, Switzerland

[21] Appl. No.: 08/875,531

[22] PCT Filed: Jan. 23, 1996

[86] PCT No.: PCT/EP96/00253

§ 371 Date: Sep. 12, 1997

§ 102(e) Date: Sep. 12, 1997

[87] PCT Pub. No.: WO96/24077

PCT Pub. Date: Aug. 8, 1996

[30] Foreign Application Priority Data

Feb. 3, 1995 [CH] Switzerland ............... 313/95

[51] Int. Cl.[7] .............. C08F 216/06; C08F 2/10; C08F 2/46; B29C 35/08

[52] U.S. Cl. ............... 522/35; 522/84; 522/86; 522/904; 522/905; 522/154; 523/106; 264/496; 524/803

[58] Field of Search .............. 522/35, 904, 905, 522/84, 86, 153, 154; 523/106; 524/802, 803; 264/496

[56] References Cited

U.S. PATENT DOCUMENTS

| | | | |
|---|---|---|---|
| 3,759,711 | 9/1973 | Rauner et al. | 96/36 |
| 4,347,198 | 8/1982 | Ohkada et al. | 264/2.3 |
| 4,670,506 | 6/1987 | Goldenberg et al. | 525/59 |
| 5,294,688 | 3/1994 | Rehmer et al. | 522/905 |
| 5,332,651 | 7/1994 | Dickinson et al. | 522/110 |
| 5,508,317 | 4/1996 | Müller | 522/85 |
| 5,527,925 | 6/1996 | Chabrecek et al. | 522/35 |

FOREIGN PATENT DOCUMENTS

| | | |
|---|---|---|
| 0321403A2 | 12/1988 | European Pat. Off. |
| 0321403A3 | 12/1988 | European Pat. Off. |
| 0486715A1 | 11/1990 | European Pat. Off. |
| 0534307A2 | 9/1992 | European Pat. Off. |

OTHER PUBLICATIONS

Chemical Abstracts, vol. 99:176861q (1983).

*Primary Examiner*—Susan W. Berman
*Attorney, Agent, or Firm*—Michael U. Lee

[57] ABSTRACT

The invention relates to a novel process for the production of mouldings, in particular contact lenses, in which a crosslinkable polymer comprising units containing crosslinkable groups, units containing a bound photoinitiator and, if desired, units containing further modifiers is crosslinked in solution, and to mouldings, in particular contact lenses, obtainable by this process. The present invention likewise relates to novel crosslinkable polymers which can be employed in the process, in particular derivatives of a polyvinyl alcohol having a molecular weight of at least about 2000 which comprises from about 0.5 to about 80%, based on the number of hydroxyl groups in the polyvinyl alcohol, of units of the formula I

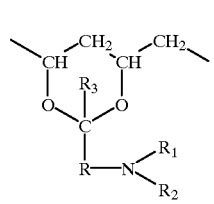

(I)

in which the variables are as defined in the description, and units of the formula IV, as defined in the description, which contain a bound photoinitiator.

27 Claims, No Drawings

CROSSLINKABLE POLYMERS CONTAINING BONDED PHOTOINITIATORS

The invention relates to a novel process for the production of mouldings, in particular contact lenses, in which a crosslinkable polymer comprising units containing crosslinkable groups, units containing a bound photoinitiator and, if desired, units containing further modifiers is crosslinked in solution, and to mouldings, in particular contact lenses, which are obtainable by this process.

The present invention also relates to novel crosslinkable polymers which can be employed in the novel process, in particular those based on starting polymers containing functional groups, for example hydroxyl groups, on the polymer chain or functional groups, for example imino groups, in the polymer chain or functional groups bonded to the polymer skeleton via a bridge, where these functional groups allow covalent bonds to compounds containing a crosslinkable modifier group or another modifier group. These starting polymers are, in particular, polyhydroxyl compounds having a 1,2- and/or 1,3-diol structure, such as polyvinyl alcohol, or hydrolysed copolymers of vinyl acetate, for example copolymers with vinyl chloride, N-vinylpyrrolidone, etc.

The invention furthermore relates to crosslinked polymers, either homopolymers or copolymers, made from these novel crosslinkable polymers, to a process for the preparation of the novel crosslinkable polymers and the homopolymers and copolymers obtainable therefrom, to mouldings made from said homopolymers or copolymers, in particular contact lenses made from these homopolymers or copolymers, and to a process for the production of contact lenses using the said homopolymers or copolymers.

Contact lenses based on polyvinyl alcohol have already been disclosed. For example, EP 216 074 discloses contact lenses comprising polyvinyl alcohol containing (meth) acryloyl groups bonded via urethane groups. EP 189 375 describes contact lenses comprising polyvinyl alcohol crosslinked by means of polyepoxides.

Furthermore, some specific acetals containing crosslinkable groups have also already been disclosed. In this connection, we refer, for example, to EP 201 693, EP 215 245 and EP 211 432. EP 201 693 describes, inter alia, acetals of unbranched aldehydes having 2 to 11 carbon atoms carrying a terminal amino group which is substituted by a $C_3$–$C_{24}$olefinically unsaturated organic radical. This organic radical contains a functionality which withdraws electrons from the nitrogen atom, and furthermore the olefinically unsaturated functionality is polymerizable. EP 201 693 also claims products of the reaction of the acetals characterized above with a 1,2-diol, a 1,3-diol, a polyvinyl alcohol or a cellulose. However, such products are not described directly.

If one of the acetals of EP 201 693 is mentioned at all in connection with, for example, polyvinyl alcohol, as is the case, inter alia, in Example 17 of that patent application, the acetal which can be polymerized via its olefinic group is first copolymerized with, for example, vinyl acetate. The resultant copolymer is then reacted with polyvinyl alcohol, and an emulsion having a solids content of 37%, a pH of 5.43 and a viscosity of 11,640 cps is obtained.

However, none of these references describes or suggests the novel combination with which the starting polymer is derivatized, namely the combination of units containing a crosslinkable group, together with units containing a bound photoinitiator and in addition, if desired, further units containing additional modifiers.

The present invention relates, in particular, to crosslinkable polymers in which the linking of these units to the polymer backbone of the starting polymer is covalent and these groups are bound irreversibly. Suitable starting polymers are, in particular, any polymers based on polyhydroxyl compounds, in particular those having a 1,3-diol backbone, where a certain percentage of the 1,3-diol units has been modified to give a 1,3-dioxane containing, in the 2-position, a crosslinkable radical, a radical containing a bound photoinitiator and, if desired, a radical containing any desired modifier. The present invention also relates to crosslinked homopolymers or copolymers of said crosslinkable polymers, to a process for the preparation of the novel crosslinkable polymers and the homopolymers and copolymers obtainable therefrom, to mouldings made from said homopolymers or copolymers, in particular contact lenses made from these homopolymers or copolymers, and to a process for the production of contact lenses using said homopolymers or copolymers.

The novel crosslinkable polymer is preferably a derivative of a polyvinyl alcohol having a mean molecular weight of at least about 2000 which comprises from about 0.5 to about 80%, based on the number of hydroxyl groups in the polyvinyl alcohol, of units containing crosslinkable groups, units containing a bound photoinitiator and, if desired, units containing further modifiers.

Particularly suitable units containing crosslinkable groups are those of the formula I

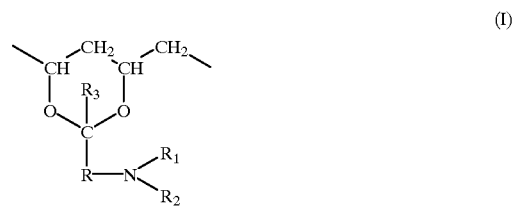

in which R is alkylene having up to 12 carbon atoms, $R_1$ is hydrogen or lower alkyl, $R_2$ is an olefinically unsaturated, electron-withdrawing, crosslinkable radical, preferably having up to 25 carbon atoms, and $R_3$ is hydrogen, a $C_1$- to $C_6$alkyl group or a cycloalkyl group.

$R_2$ is, for example, an olefinically unsaturated acyl radical of the formula $R_4$—CO—, in which $R_4$ is an olefinically unsaturated, crosslinkable radical having 2 to 24 carbon atoms, preferably having 2 to 8 carbon atoms, particularly preferably having 2 to 4 carbon atoms. In another embodiment, the radical $R_2$ is a radical of the formula II $$—CO—NH—(R_5—NH—CO—O)_q—R_6—O—CO—R_4 \qquad (II)$$

in which q is zero or one, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_4$ is as defined above.

Preferred units containing a crosslinkable group conform to the formula III

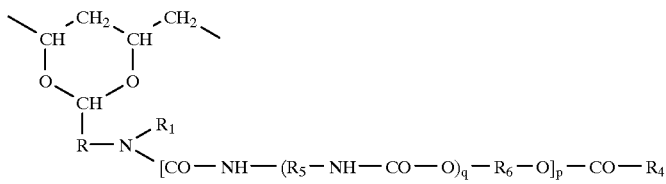

(III)

in which R is lower alkylene, $R_1$ is hydrogen or lower alkyl, p has the value zero or one, q has the value zero or one, $R_4$ is an olefinically unsaturated, crosslinkable radical having 2 to 8 carbon atoms, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms.

Lower alkylene R preferably has up to 8 carbon atoms and can be linear or branched. Suitable examples include octylene, hexylene, pentylene, butylene, propylene, ethylene, methylene, 2-propylene, 2-butylene and 3-pentylene. Lower alkylene R preferably has up to 6, particularly preferably up to 4, carbon atoms. R is particularly preferably methylene or butylene.

$R_1$ is preferably hydrogen or lower alkyl having up to seven, in particular up to four, carbon atoms, in particular hydrogen.

Lower alkylene $R_5$ or $R_6$ preferably has 2 to 6 carbon atoms and is in particular linear. Suitable examples include propylene, butylene, hexylene, dimethylethylene and, particularly preferably, ethylene.

Arylene $R_5$ or $R_6$ is preferably phenylene, which is unsubstituted or substituted by lower alkyl or lower alkoxy, in particular 1,3-phenylene, 1,4-phenylene or methyl- 1,4-phenylene.

A saturated bivalent cycloaliphatic group $R_5$ or $R_6$ is preferably cyclohexylene or cyclohexylene(lower alkylene), for example cyclohexylenemethylene, which is unsubstituted or substituted by one or more methyl groups, for example trimethylcyclohexylenemethylene, for example the bivalent isophorone radical.

The arylene unit in alkylenearylene or arylenealkylene $R_5$ or $R_6$ is preferably phenylene, unsubstituted or substituted by lower alkyl or lower alkoxy, and the alkylene unit therein is preferably lower alkylene, such as methylene or ethylene, in particular methylene. Radicals $R_5$ or $R_6$ of this type are therefore preferably phenylenemethylene or methylenephenylene.

Arylenealkylenearylene $R_5$ or $R_6$ is preferably phenylene(lower alkylene)phenylene having up to 4 carbon atoms in the alkylene unit, for example phenyleneethylenephenylene.

The radicals $R_5$ and $R_6$ are, independently of one another, preferably lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene.

For the purposes of this invention, the term "lower" in connection with radicals and compounds denotes, unless defined otherwise, radicals or compounds having up to 7 carbon atoms, preferably having up to 4 carbon atoms.

Lower alkyl has, in particular, up to 7 carbon atoms, preferably up to 4 carbon atoms, and is, for example, methyl, ethyl, propyl, butyl or tert-butyl.

Lower alkoxy has, in particular, up to 7 carbon atoms, preferably up to 4 carbon atoms, and is, for example, methoxy, ethoxy, propoxy, butoxy or tert-butoxy.

The olefinically unsaturated crosslinkable radical $R_4$ having 2 to 24 carbon atoms is preferably alkenyl having 2 to 24 carbon atoms, in particular alkenyl having 2 to 8 carbon atoms, particularly preferably alkenyl having 2 to 4 carbon atoms, for example ethenyl, 2-propenyl, 3-propenyl, 2-butenyl, hexenyl, octenyl or dodecenyl. Ethenyl and 2-propenyl are preferred, so that the —CO—$R_4$ group is the acyl radical of acrylic acid or methacrylic acid.

The bivalent group —$R_5$—NH—CO—O— is present if q is one and absent if q is zero. Units containing crosslinkable groups of the formula I in which q is zero are preferred.

The bivalent group —CO—NH—($R_5$—NH—CO—O$)_q$—$R_6$—O— is present if p is one and absent if p is zero. Units containing crosslinkable groups of the formula I in which p is zero are preferred.

In the units containing crosslinkable groups of the formula I in which p is one, the index q is preferably zero. Particular preference is given to units containing crosslinkable groups of the formula I in which p is one, the index q is zero and $R_6$ is lower alkylene.

Preferred units containing crosslinkable groups of the formula I are those which conform to the units of the formula III, in which R is lower alkylene having up to 6 carbon atoms, p is zero, and $R_4$ is alkenyl having 2 to 8 carbon atoms.

Other preferred units are those of the formula III in which R is lower alkylene having up to 6 carbon atoms, p is one, q is zero, $R_6$ is lower alkylene having 2 to 6 carbon atoms, and $R_4$ is alkenyl having 2 to 8 carbon atoms.

Further preferred units are those of the formula III in which R is lower alkylene having up to 6 carbon atoms, p is one, q is one, $R_5$ is lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene, $R_6$ is lower alkylene having 2 to 6 carbon atoms, and $R_4$ is alkenyl having 2 to 8 carbon atoms.

Units which contain a bound photoinitiator are, in particular, those of the formula IV

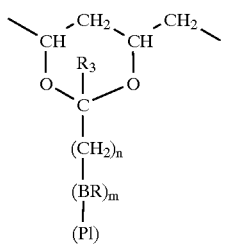

(IV)

in which
BR is an

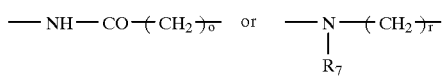

bridge or a quaternary salt thereof which has the formula

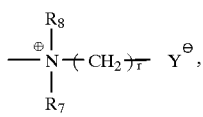

PI is the radical of a photoinitiator, in particular from the class consisting of the benzoins, such as benzoin ethers, for example benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal; anthraquinones, such as 2-methylanthraquinone, 2-ethylanthraquinone, 2-tert-butyl anthraquinone, 1-chloroanthraquinone and 2-amylanthraquinone; furthermore benzophenones, such as benzophenone and 4,4'-bis(N,N'-dimethylamino) benzophenone; thioxanthones and xanthones; acridine derivatives; phenazine derivatives; quinoxaline derivatives and 1-aminophenyl ketones and in particular 1-hydroxyphenyl ketones, in particular those of the formula V

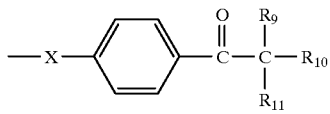

in which
X is —O—, —S— or —N($R_{12}$)—,
Y is a counterion, such as $H_2SO_4^{\ominus}, F^{\ominus}, Cl^{\ominus}, Br^{\ominus}, I^{\ominus}, CH_3COO^{\ominus}, OH^{\ominus}, BF_4^{\ominus}$ or $H_2PO_4^{\ominus}$,
$R_3$ is hydrogen, a $C_1$–$C_6$alkyl group or a cycloalkyl group,
$R_7$ is hydrogen; unsubstituted or substituted, linear or branched $C_1$–$C_{12}$alkyl; the —($CH_2$)$_r$—PI group or the —CO—$R_{13}$ group, in which $R_{13}$ is linear or branched $C_1$–$C_6$alkyl which is unsubstituted or substituted by —COOH or acrylamide, or an unsubstituted, linear or branched radical of a $C_3$–$C_8$olefin,
$R_8$ is hydrogen or unsubstituted or substituted, linear or branched $C_1$–$C_4$alkyl so long as $R_7$ is not —CO-$R_{13}$,
$R_9$ is unsubstituted or substituted, linear or branched $C_1$–$C_6$alkyl, unsubstituted or substituted, linear or branched $C_1$–$C_6$alkoxy, a 6-membered carbocyclic or heterocyclic ring, or an unsubstituted linear or branched radical of a $C_3$–$C_8$olefin, $R_{10}$ is a group of the formula

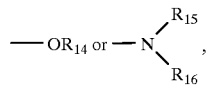

or aryl, in particular phenyl, $R_{11}$ is unsubstituted or substituted, linear or branched $C_1$–$C_6$alkyl or $C_1$–$C_6$alkoxy, a 6-membered carbocyclic or heterocyclic ring, an unsubstituted, linear or branched radical of a $C_3$–$C_8$olefin, or aryl, where
$R_9$ and $R_{11}$ together can also be cyclized to form a 5- or 6-membered carbocyclic ring,
$R_{12}$ is hydrogen or unsubstituted, linear or branched $C_1$–$C_4$alkyl,
$R_{14}$ is hydrogen or unsubstituted or substituted, linear or branched $C_1$–$C_4$alkyl,
$R_{15}$ and $R_{16}$, independently of one another, are unsubstituted, linear or branched $C_1$–$C_4$alkyl, or $R_{15}$ and $R_{16}$ are bonded together to form a 5- or 6-membered heterocyclic ring,
m is 0 or 1,
n is a number from 1 to 12,
o is a number from 1 to 6, and
r is a number from 2 to 6,
where substituted radicals are substituted, in particular, by $C_1$–$C_4$alkyl or by $C_1$–$C_4$alkoxy, with the following provisos:
  if the BR bridge is a quaternary salt, n is a number from 2 to 12;
  $R_{14}$ is not hydrogen if $R_9$ is a $C_1$–$C_6$alkoxy radical; and
  $R_7$ is —CO—$R_{13}$ when n=1.
If the abovementioned substituents $R_7$ to $R_{16}$ are alkyl radicals having various chain lengths from $C_1$ to $C_{12}$, they are linear or branched radicals, for example the following alkyl radicals: methyl, ethyl, n-propyl, isopropyl, n-butyl, sec-butyl, tert-butyl, n- or isoamyl, n-hexyl, 2-methylpentyl, 2,2-dimethylbutyl, n- or isoheptyl, n- or isooctyl, n- or isononyl, n- or isodecyl or n- or isododecyl.
If the alkyl or alkoxy radicals are substituted, suitable substituents are, for example, aryl, in particular phenyl.
In the preferred units of the formula IV, $R_3$ is hydrogen, n is the number 1, m=0, and PI is a group of the formula V. Examples of radicals of the formula V are the following formulae:

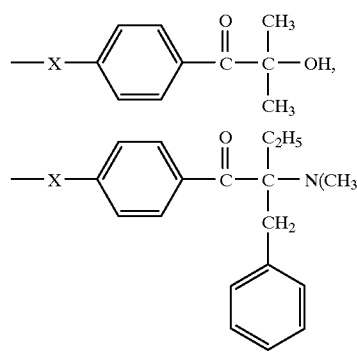

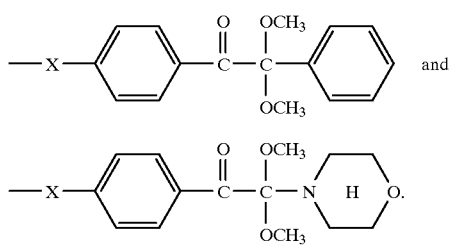 and

Particular preference is given to the radicals of the formula V in which X is —O—, $R_9$ and $R_{11}$, independently of one another, are unsubstituted $C_1$–$C_6$alkyl, and $R_{10}$ is the —OH radical.

Three very preferred units of the formula IV conform to the formulae IVA, IVB and IVC

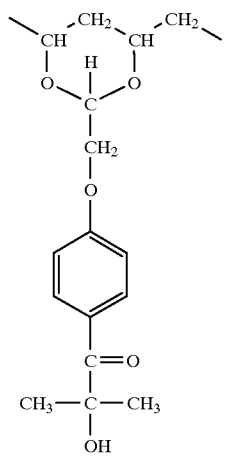

IVA

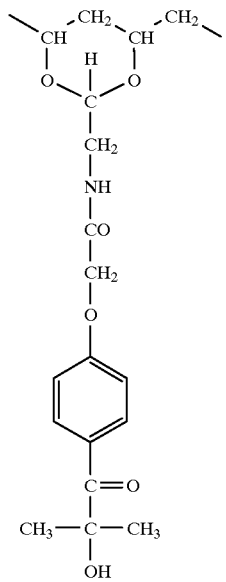

(IVB)

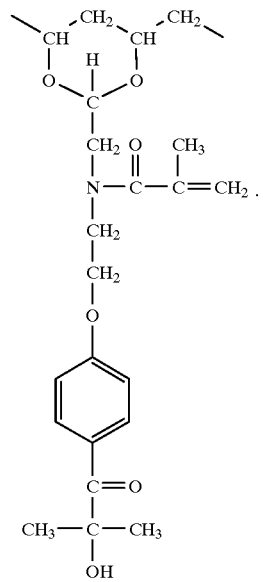

(IVC)

Suitable units containing a further modifier are various units, in particular those containing acidic groups and conforming to the general formula VII

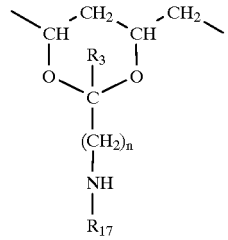

VII in which $R_3$ is hydrogen, a $C_1$ to $C_6$alkyl group or a cycloalkyl group, n is a number from 1 to 12, and $R_{17}$ is the radical of a monobasic, dibasic or tribasic, saturated or unsaturated, aliphatic or aromatic organic acid or sulfonic acid.

$R_{17}$ is, in particular, the radical of chloroacetic acid, succinic acid, glutaric acid, adipic acid, pimelic acid, maleic acid, fumaric acid, citraconic acid, itaconic acid, acrylic acid or methacrylic acid.

The units of the formula VII can be prepared, for example, by reacting ω-aminoalkyl acetals or ketals of the formula VII'

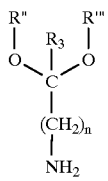

(VII')

in which the symbols R" and R'", independently of one another, are hydrogen, lower alkyl or lower alkanoyl, $R_3$ and n are as defined under the formula VII, (in a manner known per se starting, for example, from aminoacetaldehyde dimethyl acetal and an anhydride of an acid, such as succinic anhydride, itaconic anhydride or maleic anhydride) with a polyvinyl alcohol comprising units of the formula X in acidic medium.

Suitable units containing a further modifier are likewise, for example, those containing basic groups and conforming to the general formula VIII

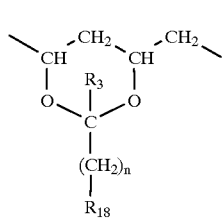
(VIII)

in which $R_3$ and n are as defined under the formula VII, and $R_{18}$ is a primary, secondary or tertiary amino group or a quaternary amino group of the formula IX

(IX)

in which R' is hydrogen or, in each case independently of the others, a $C_1$–$C_4$alkyl radical, and Y is as defined under the formula IV.

These units of the formula VIII are obtained, for example, by reacting ω-aminoalkyl acetals or ketals of the formula VIII'

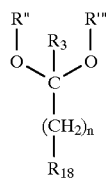
(VIII')

in which the symbols R" and R'", independently of one another, are hydrogen, lower alkyl or lower alkanoyl, $R_3$ and n are as defined under the formula VII, and $R_{18}$ is as defined above, (for example starting from aminoacetaldehyde dimethyl acetal) with a polyvinyl alcohol containing units of the formula X

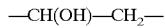 —CH(OH)—CH$_2$— (X)

in acidic medium.

The novel crosslinkable polymers comprising units containing a crosslinkable group, units containing a bound photoinitiator and, if desired, units containing a further modifier are preferably derivatives of polyvinyl alcohol having a molecular weight of at least about 2000.

The polyhydroxyl compounds, in particular the polyvinyl alcohols which can be derivatized in accordance with the invention, preferably have a mean molecular weight of at least 2000. The upper limit to their molecular weight is up to 1,000,000. They preferably have a molecular weight of up to 300,000, in particular of up to 100,000, very particularly preferably of up to about 50,000.

Polyhydroxyl compounds which are suitable for the purposes of the invention, in particular polyvinyl alcohols, usually have principally a poly(2-hydroxy) ethylene structure. However, the polyvinyl alcohols derivatized in accordance with the invention can also contain hydroxyl groups in the form of 1,2-glycols, such as copolymer units of 1,2-dihydroxyethylene, as can be obtained, for example, by alkaline hydrolysis of vinyl acetate-vinylene carbonate copolymers.

In addition, the polyvinyl alcohols derivatized in accordance with the invention can also contain small proportions, for example of up to 20%, preferably of up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar comonomers usually used.

Polyvinyl alcohols (PVA) which can be used as starting polymers are commercially available polyvinyl alcohols, for example Vinol® 107 from Air Products (MW=22,000 to 31,000, 98–98.8% hydrolysed), Polysciences 4397 (MW= 25,000, 98.5% hydrolysed), BF 14 from Chan Chun, Elvanol® 90-50 from DuPont and UF-120 from Unitika. Other producers are, for example, Nippon Gohsei (Gohsenol®), Monsanto (Gelvatol®), Wacker (Polyviol®) or the Japanese producers Kuraray, Denki and Shin-Etsu. However, it is advantageous to use Mowiol® products from Hoechst, in particular those of the 3-83, 4-88, 4-98, 6-88, 6-98, 8-88, 8-98, 10-98, 20-98, 26-88 and 40-88 type.

The PVAs are prepared by basic or acidic, partial of virtually complete hydrolysis of polyvinyl acetate.

As mentioned above, it is also possible to use copolymers of hydrolysed or partially hydrolysed vinyl acetate, which are obtainable, for example, as hydrolysed ethylene-vinyl acetate (EVA), or vinyl chloride-vinyl acetate, N-vinylpyrrolidone-vinyl acetate and maleic anhydride-vinyl acetate.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, in particular less than 20% of polyvinyl acetate units. Preferred amounts of residual acetate units in the polyvinyl alcohol derivatized in accordance with the invention are, based on the total amount of vinyl alcohol units and acetate units, from about 2 to 20%, preferably from about 2 to 16%, in particular from 2 to 12%, especially from 0.5 to 3%.

The compounds comprising units of the formula I or III can be prepared in a manner known per se. For example, a polyvinyl alcohol having a molecular weight of at least about 2000 which comprises units of the formula X can be reacted with from about 0.5 to 80%, based on the number of hydroxyl groups in the compound of the formula X, of a compound of the formula (XI)

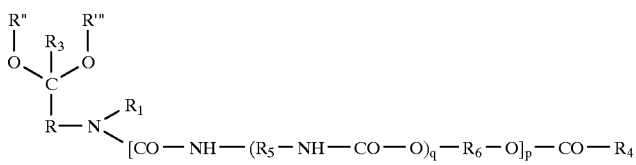

(XI)

in which R" and R'", independently of one another, are hydrogen, lower alkyl or lower alkanoyl, such as acetyl or propionyl, and the other variables are as defined under the formulae I and III, in particular in acidic medium.

Alternatively, a polyvinyl alcohol having a molecular weight of at least about 2000 which comprises units of the formula X can be reacted with a compound of the formula XII

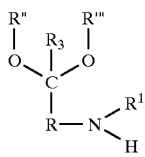

(XII)

in which the variables are as defined under the compound of the formula XI, in particular under acidic conditions, and the resultant cyclic acetal or ketal can subsequently be reacted with a compound of the formula XIII

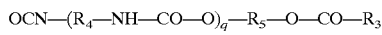

$OCN-(R_4-NH-CO-O)_q-R_5-O-CO-R_3$  (XIII)

in which the variables are as defined under the compound of the formula XI.

Alternatively, the product obtainable as described above from a compound of the formula X and a compound of the formula XII can be reacted with a compound of the formula XIV

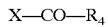

$X-CO-R_4$  (XIV)

in which $R_4$ is, for example, alkenyl having 2 to 8 carbon atoms, and X is a reactive group, for example etherified or esterified hydroxyl, or halogen, in particular chlorine.

Compounds of the formula XI in which p is zero are disclosed, for example, in EP 201 693. Compounds of the formula XII are also described therein. Compounds of the formula XIII are known per se or can be prepared in a manner known per se. An example of a compound of the formula XIII in which q is zero is isocyanatoethyl methacrylate. An example of a compound of the formula XIII in which q is one is the product of the reaction of isophorone diisocyanate with 0.5 equivalent of hydroxyethyl methacrylate. Compounds of the formula XIV are known per se, a typical representative being methacryloyl chloride. Compounds of the formula XI in which p and/or q are 1 can be prepared in a manner known per se from the abovementioned compounds, for example by reacting a compound of the formula XII with isocyanatoethyl methacrylate or by reacting a compound of the formula XII with isophorone diisocyanate which has previously been terminated with 0.5 equivalent of hydroxyethyl methacrylate.

The units of the formula IV can, in the case where m=0, be obtained, for example, from a compound of the formula IV'

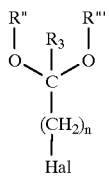

(IV')

in which the symbols R", R'", $R_3$ and n are as defined above, and Hal is a halogen atom, in particular Cl, for example chloroacetaldehyde dimethyl acetal, by reaction with a photoinitiator, for example of the formula

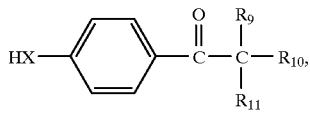

for example 2-hydroxy-1-(4-hydroxyphenyl)-2-methylpropan-1-one, at a temperature of up to about 160° C. in an aprotic polar solvent, such as dimethyl sulfoxide, with a base in the presence of a catalyst, for example tetramethylammonium iodide, to give a compound of the formula IV"

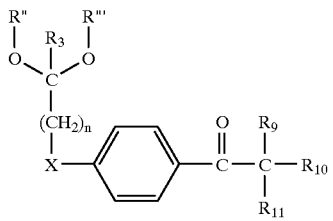

(IV")

in which the symbols are as defined above, followed by reaction with a polyvinyl alcohol comprising units of the formula X in acidic medium.

Units of the formula IV in which m=1 can be obtained, for example, from compounds of the formula IV'"

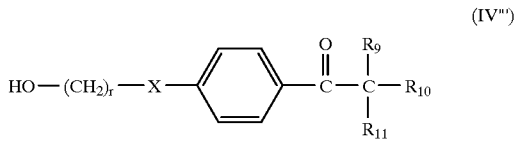

(IV'")

via the methanesulfonic acid ester, followed by reaction with an ω-aminoalkyl acetal to give a compound of the formula IV""

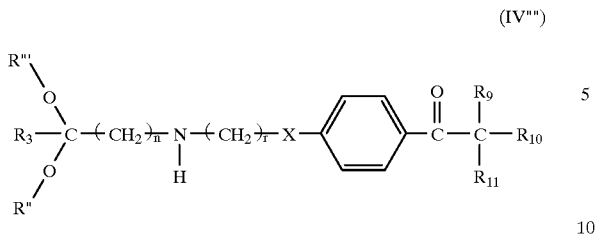
(IV'''')

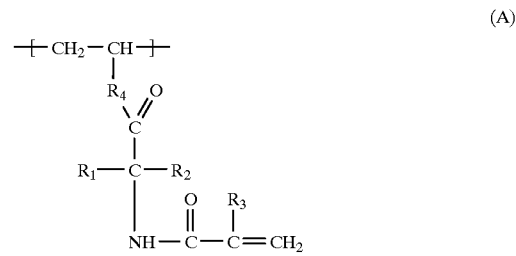
(A)

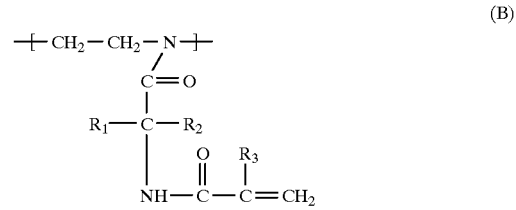
(B)

in which the symbols are as defined above, if desired further reaction with a compound which introduces the radical $R_7$, if this is not hydrogen, and finally reaction of the acetal of the formula IV'''' with a polyvinyl alcohol comprising units of the formula X in acidic medium.

Crosslinkable polymers comprising units containing crosslinkable groups, units containing a bound photoinitiator and, if desired, units containing further modifiers can advantageously be obtained by means of a one-pot process from the corresponding abovementioned acetals or ketals containing a crosslinkable group of the formula XI, a bound photoinitiator, for example of the formula IV'' or of IV'''', or a further modifier, for example of the formula VIII', by reaction with a polyvinyl alcohol comprising units of the formula X in acidic medium. It is advantageous to carry out this reaction in the absence of UV light, since otherwise undesired, premature crosslinking can take place. The acetals and ketals employed can also be replaced by the corresponding aldehydes and ketones.

Surprisingly, the crosslinkable polymers comprising units containing crosslinkable groups, units containing a bound photoinitiator and, if desired, units containing further modifiers are extremely stable. This is unexpected to the person skilled in the art since higher-functional acrylates, for example, usually require stabilization. If such compounds are not stabilized, rapid polymerization usually occurs. However, spontaneous crosslinking due to homopolymerization does not occur with the novel crosslinkable polymers. The crosslinkable polymers can, in addition, be purified in a manner known per se, for example by precipitation with acetone, dialysis or ultrafiltration, particular preference being given to ultrafiltration. This purification operation allows the crosslinkable polymers to be obtained in extremely pure form, for example as concentrated aqueous solutions, which are free or at least substantially free from reaction products, such as salts, and starting materials, or other non-polymeric constituents.

The preferred method for the purification of the novel crosslinkable polymers, ultrafiltration, can be carried out in a manner known per se. It is possible to carry out the ultrafiltration repeatedly, for example from two to ten times. Alternatively, the ultrafiltration can also be carried out continuously until the desired degree of purity has been achieved. The desired degree of purity can in principle be as great as desired. A suitable measure of the degree of purity is, for example, the sodium chloride content of the solution, which can easily be determined in a manner known per se.

In addition to the abovementioned units, the novel water-soluble, crosslinkable prepolymers can also comprise further modifier units. Of the many possibilities for such modifiers, the following are mentioned by way of example:

Further units containing crosslinkable groups are, for example, those of the formulae A and B in which
$R_1$ and $R_2$ embody amino acid radicals and are, independently of one another: hydrogen, a
$C_1$–$C_8$alkyl group, an aryl group or a cyclohexyl group, these groups being unsubstituted or monosubstituted or polysubstituted,
$R_3$ is hydrogen or a $C_1$–$C_4$alkyl group, and
$R_4$ is an —O— or —NH— bridge.

Further units comprising crosslinkable groups are, for example, those of the formula C

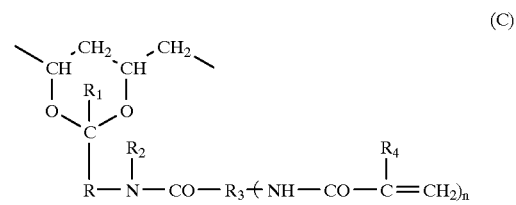
(C)

in which
R is a linear or branched bivalent radical of a $C_1$–$C_{12}$alkane, preferably of a $C_1$–$C_6$alkane,
$R_1$ is hydrogen, a $C_1$–$C_6$alkyl group or a cycloalkyl group, preferably a cyclohexyl group,
$R_2$ is hydrogen or a $C_1$–$C_6$alkyl radical,
$R_3$ is the

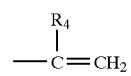

group if n=0 or the

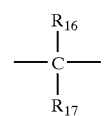

bridge is n=1,
$R_4$ is hydrogen or $C_1$–$C_4$alkyl,
n is zero or 1, preferably 0, and
$R_{16}$ and $R_{17}$, independently of one another, are hydrogen, linear or branched $C_1$–$C_8$alkyl, aryl, preferably phenyl or cyclohexyl;

or those of the formula D

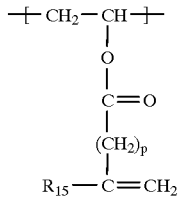
(D)

in which $R_{15}$ is hydrogen or a $C_1$–$C_4$alkyl group, in particular $CH_3$, and p is from zero to 6, preferably from zero to 2, especially zero.

Examples of units containing crosslinkable groups bonded via urethane or further modifier groups bonded via urethane are those of the formula F or G

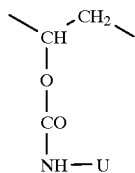
(F)

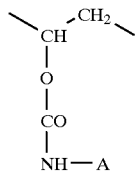
(G)

in which

U is the

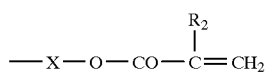

or —Y—NH—CO—O—Z—O—CH=$CH_2$ group,

X is a bridge having 2 to 12 carbon atoms, in particular an aliphatic, cycloaliphatic or aromatic bridge, especially alkylene, cyclohexylene or phenylene, which are unsubstituted or in particular substituted by lower alkyl, $R_2$ is hydrogen or a $C_1$–$C_4$alkyl group, Y is a bridge having 7 to 12 carbon atoms with the same preferences as for X, Z is a $C_2$- to $C_{12}$alkylene bridge, which may be interrupted once or more than once by oxygen atoms, and A is an organic radical having 1 to 18 carbon atoms, in particular an aliphatic, cycloaliphatic or aromatic radical, especially alkyl, cycloalkyl or phenyl, which are unsubstituted or in particular substituted by lower alkyl.

Examples of units containing a covalently bonded reactive dye radical are those of the formula H, I, J or K

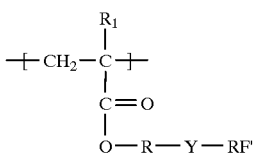
(H)

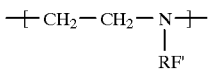
(I)

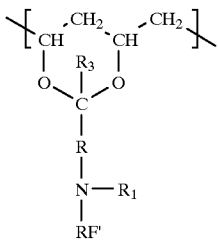
(J)

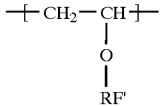
(K)

in which

RF' is a radical of the formula

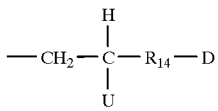

in which

D is the radical of an organic dye, $R_{14}$ is a divalent electron-withdrawing group, U is hydrogen or halogen, R is the divalent radical of a $C_1$–$C_{12}$alkane, $R_1$ is hydrogen or $C_1$–$C_4$alkyl, $R_3$ is hydrogen, $C_1$–$C_6$alkyl or cycloalkyl, and Y is —O— or —N($R_1$)—.

The novel crosslinkable polymers are water-soluble, yet can be crosslinked in an extremely effective manner, in particular by photocrosslinking.

The present invention therefore furthermore relates to a crosslinked polymer which can be obtained by photocrosslinking a crosslinkable polymer in the presence or absence of additional vinylic comonomer. These crosslinked polymers are insoluble in water.

In the case of photocrosslinking, it is usual to add a photoinitiator which is capable of initiating free-radical crosslinking. However, there is no need to add an additional photoinitiator in the present process since the photoinitiator is already present in the crosslinkable polymer as bound photoinitiator. The crosslinking can be carried out by means of radiation alone, such as by actinic radiation, for example UV light, or ionizing radiation, for example gamma rays or X-rays.

The photocrosslinking is appropriately carried out in a solvent. Suitable solvents are in principle all those which dissolve polyvinyl alcohol and any vinylic comonomers additionally used, for example water, alcohols, such as lower alkanols, for example ethanol or methanol, furthermore carboxamides, such as dimethylformamide or dimethyl sulfoxide, likewise mixtures of suitable solvents, for example mixtures of water with an alcohol, for example a water/ethanol or water/methanol mixture.

The photocrosslinking is preferably carried out directly from an aqueous solution of the novel crosslinkable polymers, which can be obtained as a result of the preferred purification step, namely ultrafiltration, if desired after addition of an additional vinylic comonomer. For example, the photocrosslinking can be carried out from an approximately 15 to 40% aqueous solution.

The process for the preparation of the novel crosslinked polymers comprises, for example, photocrosslinking a crosslinkable polymer, in particular in essentially pure form, ie. for example, after a single or repeated ultrafiltration, preferably in solution, in particular in aqueous solution, in the presence or absence of an additional vinylic comonomer.

The vinylic comonomer which can additionally be used in accordance with the invention in the photocrosslinking can be hydrophilic, hydrophobic or a mixture of hydrophobic and hydrophilic vinylic monomers. Suitable vinylic monomers include, in particular, those which are usually used in the production of contact lenses. The term "hydrophilic vinylic monomer" is taken to mean a monomer which, as a homopolymer, typically gives a polymer which is soluble in water or is capable of absorbing at least 10% by weight of water. Analogously, the term "hydrophobic vinylic monomer" is taken to mean a monomer which, as a homopolymer, typically gives a polymer which is insoluble in water or is capable of absorbing less than 10 per cent by weight of water.

In general, from about 0.01 to 80 units of a typical vinylic comonomer react per unit of formula I of the crosslinkable polymers.

If a vinylic comonomer is used, the crosslinked novel polymers preferably comprise from about 1 to 15 per cent, particularly preferably from about 3 to 8 per cent, of units of crosslinkable polymer, based on the number of hydroxyl groups of the polyvinyl alcohol which are reacted with from about 0.1 to 80 units of the vinylic monomer.

The proportion of vinylic comonomers, if used, is preferably from 0.5 to 80 units, in particular from 1 to 30 units, particularly preferably from 5 to 20 units, of vinylic comonomer per units of the formula I in the crosslinkable polymer.

It is furthermore preferred to use a hydrophobic vinylic comonomer or a mixture of a hydrophobic vinylic comonomer and a hydrophilic vinylic comonomer which comprises at least 50 per cent by weight of a hydrophobic vinylic comonomer. This allows the mechanical properties of the polymer to be improved without drastically reducing the water content. However, both conventional hydrophobic vinylic comonomers and conventional hydrophilic vinylic comonomers are in principle suitable for the copolymerization with the novel crosslinkable polymers.

Suitable hydrophobic vinylic comonomers include, without this being a comprehensive list, $C_1$–$C_{18}$alkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has 1 to 6 carbon atoms, $C_2$–$C_{10}$perfluoroalkyl acrylates and methacrylates and correspondingly partially fluorinated acrylates and methacrylates, $C_3$–$C_{12}$perfluoroalkyl ethylthiocarbonylaminoethyl acrylates and -methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. Preference is given to, for example, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris(trimethylsilyloxy)silylpropyl methacrylate, 3-methacryloxypropyl-pentamethyldisiloxane and bis(methacryloxypropyl)tetramethyldisiloxane.

Suitable hydrophilic vinylic comonomers include, without this being a comprehensive list, hydroxy-substituted lower alkyl acrylates and methacrylates, acrylamide, methacrylamide, lower alkylacrylamides and -methacrylamides, methoxylated acrylates and methacrylates, hydroxy-substituted lower alkylacrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- and 4-vinylpyridine, acrylic acid, methacrylic acid, amino- (where the term "amino" also covers quaternary ammonium), mono(lower alkyl)amino- or di(lower alkyl)amino(lower alkyl) acrylates and methacrylates allyl alcohol and the like. Preference is given to, for example, hydroxy-substituted $C_2$–$C_4$alkyl (meth)acrylates, five- to seven-membered N-vinyllactams, N,N-di-$C_1$–$C_4$alkyl(meth)acrylamides and vinylically unsaturated carboxylic acids having a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide and the like.

Preferred hydrophobic vinylic comonomers are methyl methacrylate and vinyl acetate.

Preferred hydrophilic vinylic comonomers are 2-hydroxyethyl methacrylate, N-vinylpyrrolidone and acrylamide.

The novel crosslinkable polymers comprising units containing crosslinkable groups, units containing a bound photoinitiator and, if desired, units containing further modifiers can be converted into mouldings, in particular contact lenses, in a manner known per se, for example by carrying out the photocrosslinking of the novel crosslinkable polymers in a suitable contact-lens mould. The invention therefore furthermore relates to mouldings essentially comprising a novel crosslinked polymer. Further examples of novel mouldings, besides contact lenses, are biomedical mouldings and mouldings for specifically ophthalmic purposes, for example intraocular lenses, eye bandages, mouldings which can be used in surgery, such as heart valves, artificial arteries or the like, furthermore films and membranes, for example membranes for diffusion control, photostructurable films for information storage, and photoresist materials, for example membranes and mouldings for etch resists and screen printing resists.

A specific embodiment of the invention relates to contact lenses comprising a novel crosslinked polymer made from a novel crosslinkable polymer or essentially comprising or consisting of a novel crosslinked polymer. Contact lenses of this type have a range of unusual and extremely advantageous properties, including, for example, excellent compatibility with the human cornea, based on a balanced ratio between water content (about 50–90% by weight, in particular 60–85% by weight), high oxygen permeability and very good mechanical properties, for example transparency, clarity, freedom from stresses and tear strength. In addition, the novel contact lenses have high dimensional stability. Even after autoclaving one or more times at, for example, about 120° C. for about 30–40 minutes, no changes in shape are observed.

It is furthermore emphasized that the novel contact lenses, ie. those comprising a crosslinked polymer made from a crosslinkable polymer comprising units containing crosslinkable groups, units containing a bound photoinitiator and, if desired, units containing further modifiers can be produced very simply and efficiently compared with the prior art. This is due to a number of factors. Firstly, the starting materials, such as the polymer backbones, are inexpensive to obtain or prepare. Secondly, it is advantageous that the crosslinkable polymers are surprisingly stable, so that they can be subjected to very substantial purification. The crosslinking can therefore be carried out using a crosslinkable polymer which requires virtually no subsequent purification, such as, in particular, complex extraction of unpolymerized constituents. Furthermore, the crosslinking can be carried out in purely aqueous solution, so that a subsequent hydration step is unnecessary. Finally, the crosslinking takes place within less than 5 minutes, so that the process for the production of the novel contact lenses can be designed to be extremely economical from this point of view too.

All the above advantages naturally apply not only to contact lenses, but also to the other mouldings mentioned. The totality of the various advantageous aspects in the production of novel mouldings results in novel mouldings being particularly suitable as mass-produced articles, for example as contact lenses, which are worn for a short time span (from about 1 to 4 days) and are then replaced by new lenses.

The present invention furthermore relates to the production of the novel mouldings, in particular the novel contact lenses. These processes are illustrated below using the example of contact lenses. However, these processes can also be used for the other mouldings mentioned.

The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198.

The present invention also relates to a novel process for the production of mouldings, in particular contact lenses, in which a novel crosslinkable polymer is crosslinked in solution, and to mouldings, in particular contact lenses, obtainable by this process. The mouldings obtainable by crosslinking in this way are insoluble, but swellable, in water.

In detail, this process for the production of mouldings, in particular contact lenses, comprises the following steps:

a) Preparation of an essentially aqueous solution of a crosslinkable polymer comprising units containing crosslinkable groups, units containing a bound photoinitiator and, if desired, units containing further modifiers, b) introduction of the resultant solution into a mould, c) initiation of the crosslinking, in particular in water or in an organic solvent in which the crosslinkable polymer is dissolved, and d) opening of the mould so that the moulding can be removed.

Unless expressly excluded below, the comments and preferences given above in connection with the crosslinkable polymers comprising units containing crosslinkable groups, units containing a bound photoinitiator and, if desired, units containing further modifiers and the comments and preferences given in connection with the processes for the preparation of polymers and production of mouldings, in particular contact lenses, from these crosslinkable polymers also apply in connection with the above-described process comprising steps a), b), c) and d). This statement applies to all cases in which the comments and preferences in connection with crosslinkable polymers comprising units containing crosslinkable groups, units containing a bound photoinitiator and, if desired, units containing further modifiers can be applied appropriately to the process described above.

The crucial criteria regarding whether a crosslinkable polymer can be employed in the novel process are that the crosslinkable polymer is soluble in water and comprises units containing crosslinkable groups, units containing a bound photoinitiator and, if desired units containing further modifiers.

An essentially aqueous solution of a crosslinkable polymer can be prepared in a manner known per se, for example by isolating the water-soluble, crosslinkable polymer, for example in pure form, ie. free from undesired constituents, and dissolving the crosslinkable polymer in an essentially aqueous medium.

The criterion that the crosslinkable polymer is soluble in water is, for the purposes of the invention, taken to mean in particular that the crosslinkable polymer is soluble in an essentially aqueous solution at 20° C. in a concentration of from about 3 to 90 per cent by weight, preferably from about 5 to 60 per cent by weight, in particular from about 10 to 60 per cent by weight. If possible in individual cases, crosslinkable polymer concentrations of greater than 90% are also included for the purposes of the invention. Particular preference is given to crosslinkable polymer concentrations in solution of from about 15 to about 50 per cent by weight, in particular from about 15 to about 40 per cent by weight, for example from about 25 to about 40 per cent by weight.

For the purposes of this invention, essentially aqueous solutions of the crosslinkable polymer include in particular solutions in water, in aqueous salt solutions, in particular in aqueous salt solutions having an osmolarity of from about 200 to 450 milliosmol in 1000 ml (unit: mOsm/l), preferably an osmolarity of from about 250 to 350 mOsm/l, in particular about 300 mOsm/l, or in mixtures of water or aqueous salt solutions with physiologically acceptable polar organic solvents, for example glycerol. Preference is given to solutions of the water-soluble crosslinkable polymers in water alone.

The aqueous salt solutions are advantageously solutions of physiologically acceptable salts, such as buffer salts, for example phosphate salts, which are conventional in the area of contact-lens care, or isotonicizing agents, in particular alkali metal halides, for example sodium chloride, which are conventional in the area of contact-lens care, or solutions of mixtures thereof. An example of a particularly suitable salt solution is an artificial, preferably buffered tear fluid whose pH and osmolarity have been matched to natural tear fluid, for example an unbuffered, preferably buffered for example by phosphate buffer, sodium chloride solution whose osmolarity and pH conform to the osmolarity and pH of human tear fluid.

The above-defined, essentially aqueous solutions of the crosslinkable polymer are preferably pure solutions, ie. those which are free or essentially free from undesired constituents. Particular preference is given to solutions of the crosslinkable polymer in pure water or in an artificial tear fluid as described above.

The viscosity of the solution of the water-soluble, crosslinkable polymer in the essentially aqueous solution is unimportant over broad limits. However, it should preferably be a flowable solution which can be shaped without stresses.

The mean molecular weight of the crosslinkable polymer is likewise unimportant within broad limits. However, the water-soluble, crosslinkable polymer preferably has a molecular weight of from about 10,000 to about 200,000.

The crosslinkable polymer used in accordance with the invention must furthermore, as mentioned, contain crosslinkable groups. In addition to the units of the formula I mentioned at the outset containing crosslinkable groups, all conventional crosslinkable groups known to the person skilled in the art, for example photocrosslinkable or thermally crosslinkable groups, are suitable. Particularly suitable crosslinkable groups are those which contain carbon-carbon double bonds. However, in order to demonstrate the variety of crosslinkable groups which are suitable, crosslinking mechanisms which may be mentioned here, merely by way of example, are free-radical polymerization, 2+2 cycloaddition, Diels-Alder reaction, ROMP (ring opening metathesis polymerization), vulcanization, cationic crosslinking and epoxy curing.

Suitable polymeric backbones, in addition to polyvinyl alcohol (PVA), as mentioned above, are materials comprising functional groups which are capable of covalently bonding a crosslinkable group, a group containing a bound photoinitiator and, if desired, a group containing a further modifier, and those as have in some cases already been proposed as contact-lens materials, for example polymeric diols other than PVA, polymers comprising saccharides, polymers comprising vinylpyrrolidone, polymers comprising alkyl(meth)acrylates, polymers comprising alkyl(meth)acrylates which are substituted by hydrophilic groups, such as hydroxyl, carboxyl or amino groups, polyalkylene glycols, or copolymers or mixtures thereof.

The crosslinkable polymer (prepolymer) used in accordance with the invention comprises the units containing crosslinkable groups, units containing a bound photoinitiator and, if desired, units containing the further modifier(s) or reactive dye radicals, etc, in a total amount of from about 0.5 to 80%, preferably from 1 to 50%, advantageously from 1 to 25%, in particular from 2 to 15%, particularly preferably from 2 to 10%, based on the number of functional groups in the starting polymer, for example hydroxyl groups in the polyvinyl alcohol.

Polymers (prepolymers) which can be crosslinked in accordance with the invention and are intended for the production of contact lenses comprise, in particular, from about 0.5 to about 25%, especially from about 1 to 15%, particularly preferably from about 2 to 12%, of these units.

As already mentioned, for a crosslinkable polymer to be suitable in the novel process, it is essential that it is water-soluble. However, the crosslinkable polymer is uncrosslinked or at least essentially uncrosslinked, so that it is soluble in water.

Furthermore, the crosslinkable polymer is advantageously stable in the uncrosslinked state, so that it can be subjected to purification, as described above. The crosslinkable polymers are preferably employed in the crosslinking process in the form of pure solutions. The water-soluble, crosslinkable polymers can be converted into the form of pure solutions as described below, for example.

The water-soluble, crosslinkable polymers used in the novel process can preferably be purified in a manner known per se, for example by precipitation with organic solvents, such as acetone, filtration and washing, extraction in a suitable solvent, dialysis or ultrafiltration, particular preference being given to ultrafiltration. This purification operation allows the crosslinkable polymers to be obtained in extremely pure form, for example as concentrated aqueous solutions, which are referred to hereinafter as pure or essentially pure. This term is understood to refer to a crosslinkable polymer or to a solution thereof which is free or at least substantially free from undesired constituents.

Undesired constituents in this context are generally all constituents which are physiologically undesired, especially monomeric, oligomeric or polymeric starting compounds used for the preparation of the water-soluble, crosslinkable polymer, or byproducts formed during the preparation of the water-soluble, crosslinkable polymer. Preferred degrees of purity of these constituents are less than 0.01%, in particular less than 0.001%, very particularly preferably less than 0.0001% (1 ppm). It is to be noted, however, that there may be present in the solution, for example by formation as byproducts during the preparation of the water-soluble, crosslinkable polymer, constituents which are not undesired from a physiological point of view, such as for example sodium chloride. Preferred degrees of purity of these constituents are less than 1%, in particular less than 0.1%, very particularly preferably less than 0.01%. In most cases such levels of constituents may be obtained by applying 3 to 4 repeated ultrafiltration cycles.

The preferred process for the purification of the crosslinkable polymers used in the crosslinking process, namely ultrafiltration, can be carried out in a manner known per se. The ultrafiltration can be carried out repeatedly, for example from two to ten times. Alternatively, the ultrafiltration can also be carried out continuously until the desired degree of purity has been achieved. The desired degree of purity can in principle be chosen to be as great as desired.

In a preferred embodiment of the crosslinking process, an essentially aqueous solution of the crosslinkable polymer which is essentially free from undesired constituents, for example free from monomeric, oligomeric or polymeric starting compounds used for the preparation of the crosslinkable polymer, and/or free from by-products formed during the preparation of the crosslinkable polymer, is prepared in step a) and used further. This essentially aqueous solution is particularly preferably a purely aqueous solution or a solution in an artificial tear fluid as described above. It is furthermore preferred for the crosslinking process to be carried out without addition of a comonomer, for example a vinylic comonomer.

Owing to the abovementioned measures and in particular owing to a combination of said measures, the crosslinking process is carried out using a solution of the crosslinkable polymer containing no or essentially no undesired constituents requiring extraction after crosslinking.

It is therefore a particular feature of this preferred embodiment of the crosslinking process that extraction of undesired constituents is not necessary after the crosslinking.

The crosslinking process is therefore preferably carried out in such a way that the essentially aqueous solution of the crosslinkable polymer is free or essentially free from undesired constituents, in particular from monomeric, oligomeric or polymeric starting compounds used for the preparation of the crosslinkable polymer, or from by-products formed during the preparation of the crosslinkable polymer, and/or that the solution is used without addition of a comonomer.

The resultant solution can be introduced into a mould using methods known per se, such as, in particular, conventional metering, for example dropwise. The novel contact lenses can be produced in a known manner, for example in a conventional spin-casting mould, as described, for example, in U.S. Pat. No. 3,408,429, or by the full-mould process in a static mould, as described, for example, in U.S. Pat. No. 4,347,198. Appropriate moulds are made, for example, of polypropylene. Examples of suitable materials for reusable moulds are quartz and saphire glass.

The crosslinkable polymers which are suitable in accordance with the invention can be crosslinked by irradiation with ionizing or actinic radiation, for example electron beams, X-rays, UV or VIS light, ie. electromagnetic radiation or particle radiation having a wavelength in the range from about 280 to 650 nm. Particularly suitable are UV lamps, He/Cd, argon ion or nitrogen or metal vapour or NdYAG laser beams with multiplied frequency. It is known to the person skilled in the art that each selected light source requires selection and, if necessary, sensitization of the suitable photoinitiator. It has been recognized that in most cases the depth of penetration of the radiation into the water-soluble, crosslinkable polymer and the rate are in direct correlation with the absorption coefficient and concentration of the photoinitiator.

If desired, the crosslinking can also be initiated thermally. It should be emphasized that the crosslinking can take place in a very short time in accordance with the invention, for example in less than five minutes, preferably in less than one minute, in particular in up to 30 seconds, particularly preferably as described in the examples.

Apart from water, which is preferred, the crosslinking medium can additionally be any medium in which the crosslinkable polymer is soluble. In the case of polyvinyl alcohol as the principal polymer backbone, all solvents which dissolve polyvinyl alcohol are suitable, such as alcohols, for example ethanol, glycols, glycerol, piperazine (at elevated temperature), diamines, such as triethylenediamine, formamide, dimethylformamide, hexamethylphosphoric triamide, dimethyl sulfoxide, pyridine, nitromethane, acetonitrile, nitrobenzene, chlorobenzene, trichloromethane, dioxane and aqueous solutions of tetraalkylammonium bromide and iodide.

The opening of the mould so that the moulding can be removed can be carried out in a manner known per se. Whereas the process proposed in the prior art (U.S. Pat. Nos. 3,408,429 and 4,347,198) requires subsequent purification steps at this point, for example by extraction, and also steps for hydration of the resultant mouldings, in particular contact lenses, such steps are unnecessary here.

Since the solution of the crosslinkable polymer preferably comprises no undesired low-molecular-weight constituents, the crosslinked product also comprises no such constituents. Subsequent extraction is therefore unnecessary. Since the crosslinking is carried out in an essentially aqueous solution, subsequent hydration is unnecessary. These two advantages mean, inter alia, that complex subsequent treatment of the resultant mouldings, in particular contact lenses, is unnecessary. The contact lenses obtainable by the crosslinking process are therefore distinguished, in an advantageous embodiment, by the fact that they are suitable for their intended use without extraction. The term 'intended use' in this connection is taken to mean, in particular, that the contact lenses can be employed in the human eye. The contact lenses obtainable by the crosslinking process are furtherore distinguished in an advantageous embodiment by the fact that they are suitable for their intended use without hydration.

This process therefore proves to be extremely suitable for the efficient production of a large number of mouldings, such as contact lenses, in a short time. The contact lenses obtainable by this process have, inter alia, the advantages over the contact lenses known from the prior art that they can be used as intended without subsequent treatment steps, such as extraction or hydration.

The examples below serve to further illustrate the invention. In the examples, unless expressly stated otherwise, amounts are by weight and temperatures are given in degrees Celsius. Examples are not intended to represent any restriction of the invention, for example to the scope of the examples.

EXAMPLE 1

220 g (5.5 mol) of sodium hydroxide are dissolved in 300 g of water and 700 g of ice in a 3 liter reactor fitted with stirrer and cooling means. The sodium hydroxide solution is cooled to 10° C., and 526 g (5.0 mol) of aminoacetaldehyde dimethyl acetal and 50 mg of 4-hydroxy-2,2,6,6-tetramethylpiperidine 1-oxide (free-radical inhibitor) are added. 548.6 g (5.5 mol) of methacryloyl chloride are slowly added to this solution at 10° C. over the course of 3.5 hours. When the addition is complete, the pH slowly drops to 7.2, and amine is no longer detectable by GC. The reaction mixture is extracted with 500 ml of petroleum ether in order to remove impurities, and the water phase is saturated with sodium chloride and extracted three times with 500 ml of tert-butyl methyl ether. The organic phase is dried using magnesium sulfate, filtered and evaporated on a rotary evaporator. The 882.2 g of yellowish oil obtained are slowly stirred into 2000 ml of petroleum ether at −10° C. using an Ultraturax. The product crystallizes, and is filtered off and dried, giving 713.8 g of methacrylamidoacetaldehyde dimethyl acetal (86% of theory), melting point 30–32° C. The product is 99.7% pure according to GC.

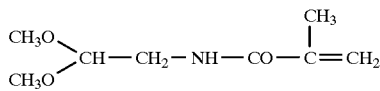

EXAMPLE 2

1-[4-(2,2-Dimethoxyethoxy)phenyl]-2-hydroxy-2-methylpropan-1-one 10 g (55.5 mmol) of 2-hydroxy-1-(4-hydroxyphenyl)-2-methylpropan-1-one are dissolved in 50 g of methanol together with 2.22 g (55.5 mmol) of NaOH, and kept at 150° C. for 5 hours in a bomb tube with 20 g of chloroacetaldehyde dimethyl acetal. The reaction mixture is evaporated, and the residue is dissolved in ether and washed with 0.1 N NaOH. The crude product (14.8 g) is crystallized from ether/petroleum ether, giving 9.8 g (65% of theory) of a beige product of m.p. 52–53° C.

| Analysis: | found | calc. |
|---|---|---|
| C: | 62.53% | 62.67% |
| H: | 7.54% | 7.51% |

$\lambda_{max}$: 276 nm, $\epsilon$=14,800 [1/mol/cm]

NMR data: 1.63 ppm (s) 6 methyl protons, 3.47 ppm (s) 6 methoxy protons, 4.02 ppm (d) 2 methylene protons, 4.25 ppm (s) OH, 4.75 ppm (t) acetal proton, 6.93 ppm (d) and 8.07 (d) 4 aromatic protons.

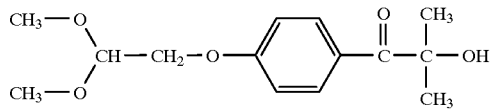

EXAMPLE 3
N-(2,2-Methoxyethyl)-2-[4-(2-hydroxy-2-methylpropionyl) pheno xyacetamide 5.58 g (30.74 mmol) of 2-chloro-N-(2,2-dimethoxyethyl) acetamide and 5.54 g (30.74 mmol) of 2-hydroxy-1-(4-hydroxyphenyl)-2-methylpropan-1-one are dissolved in 50 ml of dimethyl sulfoxide, and 3.76 g (30.74 mmol) of potassium carbonate and 0.06 g (0.3 mmol) of tetramethylammonium iodide are added. The reaction mixture is heated at 100° C. for 7 hours and cooled, water is added, and the mixture is extracted with methylene chloride. The crude product is crystallized from ether, giving 4.4 g (44% of theory) of white crystals of m.p.: 99–100° C.

| Analysis: | found | calc. |
|---|---|---|
| C: | 58.99% | 59.07% |
| H: | 7.18% | 7.13% |
| N: | 4.15% | 4.31% |

UV data: $\lambda_{max}$: 274 nm, $\epsilon$=14,300 [1/mol/cm]

NMR data: 1.63 ppm (s) 6 methyl protons, 3.39 ppm (s) 6 methoxy protons, 3.50 ppm (t) 2 methylene protons, 4.08 ppm (s) OH, 4.40 ppm (t) acetal proton, 4.57 ppm (s) 2 methylene protons, 7.00 ppm (d) and 8.10 ppm (d) 4 aromatic protons, 6.7 ppm (broad) 1 amide proton.

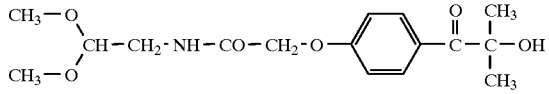

EXAMPLE 4
2-[4-(2-Hydroxy-2-methylpropionyl)phenoxy]ethyl methanesulfonate 224.3 g (1 mol) of 2-hydroxy-1-[4-(2-hydroxyethoxy) phenyl]-2-methylpropan-1-one are suspended in 400 ml of tetrahydrofuran, and 114.6 g (1.0 mol) of methanesulfonyl chloride are added. The mixture is cooled, and 101.2 g (1.0 mol) of triethylamine dissolved in 200 ml of tetrahydrofuran are slowly added dropwise at a temperature of below 18° C. When the reaction is complete, the salt formed is filtered off and washed, and the organic phase is evaporated in a rotary evaporator, giving 325 g of brown oil, which is dissolved in 700 ml of methylene chloride and washed with HCl and water. After the solvent has been evaporated, the product is crystallized from ethanol/water (6:4), giving 212 g (70.3% of theory) of product of m.p.: 76.8–77.4° C.

NMR data: 1.63 ppm (s) 6 methyl protons, 3.10 ppm (s) 3 methyl protons (mesylate), 4.3 and 4.6 ppm 4 methylene protons, 6.9 and 8.0 ppm (d) 4 aromatic protons, 4.12 ppm OH proton.

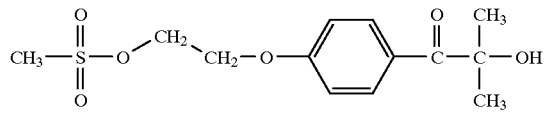

EXAMPLE 5
1-[4-[2-(2,2-Dimethoxyethylamino)ethoxy]phenyl ]-2-hydroxy-2-methyl-propan-1-one 90 g (0.29 mol) of the mesylate of the compound from Example 4 are dispersed in 270 g (2156 mol) of aminoacetaldehyde dimethyl acetal, and the dispersion is warmed to 80° C. After a reaction time of one hour, no starting material is detectable by TLC. The excess aminoacetaldehyde dimethyl acetal is removed by vacuum distillation. The reaction product is acidified by means of 1N HCl in order to hydrolyse, over the course of one hour, the Schiff's base formed. The acidic reaction solution is extracted with ether and then adjusted to pH 10 using 10% NaOH. The product is then extracted with methylene chloride, washed and dried. After removal of the solvent, the resultant oil is dried in a high vacuum, giving 89.8 g (99.6% of theory) of a brown oil.

NMR data: 1.62 ppm (s) 6 methyl protons, 2.80 ppm (d) 2 methylene protons, 3.05 ppm (t) 2 methylene protons, 3.40 ppm (s) 6 methoxy protons, 4.13 ppm (t) 2 methylene protons, 4.48 ppm (t) 1 acetal proton, 6.93 and 8.05 ppm (d) 4 aromatic protons, 4.80 ppm 1 NH proton.

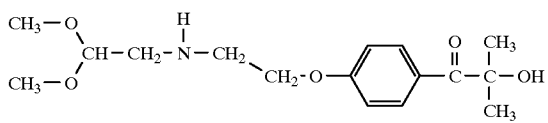

EXAMPLE 6
N-(2,2-Dimethoxy-ethyl)-N-(2-[4-(2-hydroxy-2-methylpropionyl)phenoxylethyl)-2-methyl-acrylamide 30 g (96.4 mmol) of the compound from Example 5 are dissolved in 90 ml of methylene chloride, and 9.9 g (96.4 mmol) of triethylamine are added. The mixture is cooled to 5° C., and 10.5 g (96.4 mmol) of methacryloyl chloride are added slowly. When the reaction is complete, the reaction mixture is warmed to room temperature and poured into water. The organic phase is washed with HCl and water, dried and evaporated, giving 33.2 g (90.8% of theory) of a brown oil.

UV data: $\lambda_{max}$: 278 nm, $\epsilon$=13400 [1/mol/cm]

NMR data: 1.63 ppm (s) 6 methyl protons, 1.97 ppm (broad) 3 methyl protons, 3.40 ppm (s) 6 methoxy protons, 3.60 ppm (broad) 3.89 ppm (broad) and 4.15 ppm (broad) 2 methylene protons each, 4.4–5.0 ppm 2 vinyl protons, 6.9 and 8.0 ppm 4 aromatic protons, 5.6 ppm OH proton.

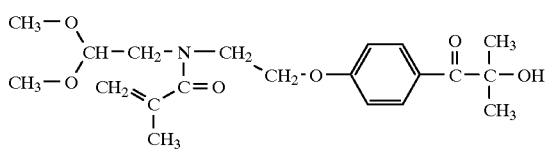

EXAMPLE 7
N-(2,2-Dimethoxyethyl)-N-(2-[4-(2-hydroxy-2-methylpropionyl)phenoxy]ethyl)-2-methylpropionamide Preparation analogous to that described in Example 6 from the compound from Example 5 and isobutyryl chloride.

NMR data: 1.1 and 1.2 ppm (d) 6 methyl protons, 1.62 ppm (s) 6 methoxy protons, 2.9 to 3.1 ppm (m) 1 methyl proton, 4.2, 3.8 and 3.5 ppm (m) 2 methyl protons each, 4.5 ppm (m) 1 acetal proton, 6.9 and 8.0 ppm (m) 2 aromatic protons each.

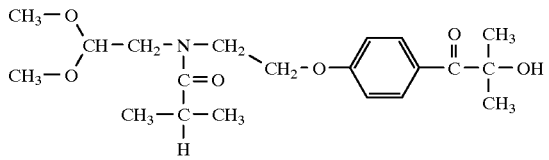

EXAMPLE 8
N-(2,2-Dimethoxyethyl)-N-(2-[4-(2-hydroxy-2-methylpropionyl)phenoxy]ethyl)succinamide 21.6 g (69.4 mmol) of the compound from Example 5 are dissolved in 100 ml of methylene chloride and reacted with 6.94 g (69.4 mmol) of freshly distilled succinic anhydride. When the reaction is complete, the product is purified by extraction, giving 24.5 g (95% of theory) of crude product, which is crystallized from ether.

| Analysis: | found | calc. |
|---|---|---|
| C: | 58.39% | 58.38% |
| H: | 7.11% | 7.10% |
| N: | 3.34% | 3.40% |

UV data: $\lambda_{max}$: 297 nm, $\epsilon$=14400 [l/mol/cm]

NMR data: 1.62 ppm (s) 6 methyl protons, 2.67–2.87 ppm (m) 4 methylene protons of succinic acid, 3.40 (d) 6 methoxy protons, 3.48 and 3.56 ppm (d) 2 methylene protons, 3.83 ppm (m) and 4.20 ppm (t) 2 methylene protons each, 4.51 ppm (t) acetal proton, 6.93 and 8.04 ppm (d) 2 aromatic protons each.

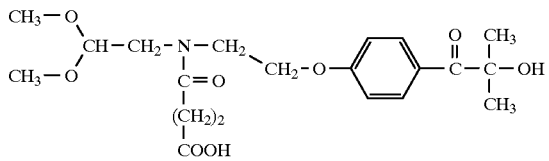

EXAMPLE 9
N-[2,2-Dimethoxyethyl]succinamide 50.04 g (0.5 mol) of freshly distilled succinic anhydride are dispersed in 100 ml of methylene chloride. 52.75 g (0.5 mol) of aminoacetaldehyde dimethyl acetal are added, and the mixture is refluxed. After 30 minutes, the homogeneous solution is evaporated in vacuo and freed from solvent at 60° C. under a high vacuum, giving a viscous oil which, according to titration with sodium hydroxide solution, has a purity of 99.4%.

NMR data: 2.63 ppm (m) 4 methylene protons of succinic acid, 3.42 ppm (s) 6 methoxy protons, 4.42 ppm (t) 1 acetal proton, 3.6 ppm (d) 2 methylene protons, 6.60 ppm (t) 1 amide proton, 9.79 ppm 1 acid proton.

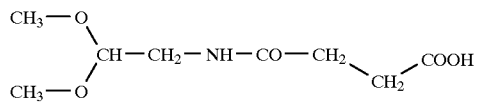

EXAMPLE 10
General method for the preparation of high-acetate products of the reaction of PVA with acetals or aldehydes 300 g of a PVA (Mowiol 4-88, unless stated otherwise) are introduced into a 2 liter twin-jacket reactor fitted with stirrer and thermometer, 800 g of demineralized water are added, and the mixture is warmed to 95° C. with stirring. After one hour, all the reactants have dissolved to give a clear solution, which is cooled to 20° C. One or more acetals in the amount given in the examples, if desired together with one or more acetal(s), 440 g of acetic acid, 100 g of conc. hydrochloric acid (37%) and sufficient demineralized water to give a total of 200 g of reaction solution are added. The mixture is stirred at 20° C. for 20 hours.

Isolation can be carried out by ultrafiltration: the reaction mixture is cooled to 15° C. and the pH is adjusted to 3.6 by means of aqueous NaOH (5%). The polymer solution is filtered through a 0.45 μm filter and purified by ultrafiltration. The ultrafiltration is carried out using a 1 KD Omega membrane from Filtron. The ultrafiltration is continued to a residual sodium chloride content of 0.004%. Before the purification is completed, the solution is adjusted to pH=7 using 0.1 N sodium hydroxide solution. Concentration gives 1995 g of a 14.54% polymer solution (92% of theory); N content (Kjeldahl determination)=0.683%, acetate content (determined by hydrolysis)=2.34 meq/g, intrinsic viscosity= 0.310, 0.5 meq/g of double bonds (determined by microhydrogenation), 15.3 meq/g of free hydroxyl groups (determined by re-acetylation), GPC analysis (in water): $M_w$=19,101, $M_n$=7522, $M_w/M_n$=2.54.

The isolation can also be carried out by precipitation: the reaction mixture is adjusted to pH 3.6 by means of triethylamine and precipitated in acetone in a ratio of 1:10. The precipitate is separated off, dispersed twice in ethanol and once in acetone and dried. The resultant product has the same properties as that obtained above by ultrafiltration.

EXAMPLE 11
General method for the preparation of low-acetate products of the reaction of PVA with acetals or aldehydes 300 g of a PVA (Mowiol 4-88, unless stated otherwise) are introduced into a 2 liter twin-jacket reactor fitted with stirrer and thermometer, 800 g of demineralized water are added, and the mixture is warmed to 95° C. with stirring. After one hour, all the reactants have dissolved to give a clear solution, which is cooled to 20° C. One or more acetals in the amount given in the examples, if desired together with one or more acetal(s), 440 g of acetic acid, 100 g of conc. hydrochloric acid (37%) and sufficient demineralized water to give a total of 2000 g of reaction solution are added. The mixture is stirred at 20° C. for 20 hours.

After 20 hours, a sample of the reaction solution is titrated with NaOH, and the degree of hydrolysis of the PVA determined: HCl=1.034 meq/g, acetic acid=0.265 meq/g, corresponding to a residual acetate content of 3.5 mol %. The reaction mixture is stirred at 25° C. for a further two hours and re-titrated: HCl=1.034 meq/g, acetic acid =0.277 meq/g, corresponding to a residual acetate content of 2.93 mol %.

The isolation can also be carried out by ultrafiltration: the reaction mixture is cooled to 15° C. and adjusted to pH 7 using aqueous NaOH (5%). The polymer solution is filtered through a 0.45 µm filter and purified by ultrafiltration. The ultrafiltration is carried out by means of a 1 KD Omega membrane from Filtron. The ultrafiltration is continued to a residual sodium chloride content of 0.002%. 1800 g of a 14.02% polymer solution (86% of theory) are obtained; N content (Kjeldahl determination)=0.741%, acetate content (according to titration)=0.605 meq/g corresponding to 2.91 mol %, intrinsic viscosity=0.327, 0.61 meq/g of double bonds (determined by microhydrogenation), 18.13 meq/g of free hydroxyl groups (determined by re-acetylation), GPC analysis (in water): $M_w$=22,007, $M_n$=9743, $M_w/M_n$=2.26.

The isolation can also be carried out by precipitation: the reaction mixture is adjusted to pH 3.6 using triethylamine and precipitated in acetone in a ratio of 1:10. The precipitate is separated off, dispersed twice in ethanol and once in acetone and dried. The resultant product is comparable to that obtained above by ultrafiltration.

EXAMPLE 12
Production of Contact Lenses

A 30% solution of the crosslinkable polymers 12b) to 12e) described below in a transparent polypropylene contact-lens mould is exposed for 6 seconds, without additional addition of an initiator, to a 200 W Oriel UV lamp (150 mW/cm$^2$). The lenses are removed from the mould. They are transparent and have the properties shown below.

EXAMPLES 12a) to e)
Products of the reaction of PVA (Mowiol 4-88, Hoechst) with various photoinitiator-containing acetals by the general preparation method from Example 10 or 11, isolation, purification and concentration by ultrafiltration 12a): 1.5 g of photoinitiator acetal from Example 3 without additional acetal, reaction as in Example 10, addition of 500 g of acetic acid, ultrafiltration through a 5KD membrane (Millipore)

| Prepolymer data (sol): | Intrinsic viscosity: 0.353 |
| --- | --- |
| | Acetate content: 12.1 mol % |
| | Photoinitiator: 0.015 meq/g |
| | UV absorption: $\lambda_{max}$ = 279 nm |
| | Optical density: 0.625 |
| | Polymer concentration: 0.278% |
| | Reaction yield of acetal: 100%. |

The passing rate of the acetal from Example 3 during ultrafiltration under the reaction conditions as in Example 10) without addition of the polyvinyl alcohol was 98–100%.

This example clearly shows that the photoinitiator acetal and thus the photoinitiator is fixed to the PVA.

12b): 3.0 g of photoinitiator acetal from Example 2, 29.0 g of acetal from Example 1, reaction as in Example 10, addition of 360 g of acetic acid, ultrafiltration through a 5 KD membrane (Millipore)

| Prepolymer data (sol): | Intrinsic viscosity: 0.330 dl/g |
| --- | --- |
| | N content: 0.75% |
| | Crosslinking agent content: 0.52 meq/g |
| | Acetate content: 8.40 mol % |
| | Photoinitiator: 0.02 meq/g |
| | UV absorption: $\lambda_{max}$ = 279 nm |
| | Optical density: 0.127 |
| | Polymer concentration: 0.04% |
| | GPC data: $M_w$ = 22 500, $M_n$ = 5759, $M_w/M_n$ = 3.9 |
| Solids content: | 30% in the sol state results in 32.1% in the gel state |

12c): 6.0 g of photoinitiator acetal from Example 2, 29.0 g of acetal from Example 1, reaction as in Example 10, addition of 360 g of acetic acid, ultrafiltration through a 5 KD membrane (Millipore)

| Prepolymer data (sol): | Intrinsic viscosity: 0.348 dl/g |
| --- | --- |
| | N content: 0.75% |
| | Crosslinking agent content: 0.53 meq/g |
| | Acetate content: 8.5 mol % |
| | Photoinitiator: 0.03 meq/g |
| | UV absorption: $\lambda_{max}$ = 279 nm |
| | Optical density: 0.212 |
| | Polymer concentration: 0.04% |
| | GPC data: $M_w$ = 21976, $M_n$ = 7191, $M_w/M_n$ = 3.0 |
| Solids content: | 30% in the sol state results in 30.3% in the gel state |

12d): 4.2 g of photoinitiator acetal from Example 6, 29.0 g of acetal from Example 1, reaction as in Example 10, addition of 360 g of acetic acid, ultrafiltration through a 5 KD membrane (Millipore)

| Prepolymer data (sol): | Intrinsic viscosity: 0.321 dl/g |
| --- | --- |
| | N content: 0.78% |
| | Crosslinking agent content: 0.53 meq/g |
| | Acetate content: 9.2 mol % |
| | Photoinitiator: 0.03 meq/g |
| | UV absorption: $\lambda_{max}$ = 279 nm |
| | Optical density: 0.145 |
| | Polymer concentration: 0.04% |
| | GPC data: $M_w$ = 19525, $M_n$ = 6651, $M_w/M_n$ = 2.93 |
| Solids content: | 30% in the sol state results in 30.6% in the gel state |

12e) 4.0 g of photoinitiator acetal from Example 8, 39.0 g of acetal from Example 1, 25 g of acidic modifier acetal from Example 9, reaction as in Example 11, reaction time 8 hours, ultrafiltration through a 3 KD membrane (Filtron)

| Prepolymer data (sol): | Intrinsic viscosity: 0.424 dl/g |
| --- | --- |
| | N content: 1.37% |
| | Crosslinking agent content: 0.62 meq/g |
| | Acid content: 0.33 meq/g |
| | Acetate content: 7.8 mol % |
| | Photoinitiator: 0.02 meq/g |
| | UV absorption: $\lambda_{max}$ = 279 nm |
| | Optical density: 0.133 |
| | Polymer concentration: 0.04% |
| | GPC data: $M_w$ = 19525, $M_n$ = 6651, $M_w/M_n$ = 2.93 |
| Solids content: | 30% in the sol state results in 30.8% in the gel state |

What is claimed is:

1. A process for the production of a moulding, which comprises the following steps:
   a) preparation of an essentially aqueous solution of a crosslinkable polymer having a 1,2- or 1,3-diol structure and comprising units containing crosslinkable olefinically unsaturated groups and units containing a bonded photoinitiator selected from the group consisting of benzoins, acetophenones, benzil, benzil ketals, anthraquinones, benzophenones, thioxanthones, xanthones, acridines, phenazines, quinoxalines, 1-aminophenyl ketones and 1-hydroxyphenyl ketones, b) introduction of the resultant solution into a mould,
c) initiation of the crosslinking, and
d) opening of the mould so that the moulding can be removed.

2. A process according to claim 1, wherein the mouldings are contact lenses.

3. A process according to claim 1, wherein the essentially aqueous solution of the crosslinkable polymer is free or essentially free from monomeric, oligomeric or polymeric starting compounds used for the preparation of the crosslinkable polymer, or from by-products formed during the preparation of the crosslinkable polymer.

4. A process according to claim 1, wherein the essentially aqueous solution of the crosslinkable polymer is used without addition of a vinylic comonomer.

5. A process according to claim 1, wherein the crosslinkable polymer solution is free or essentially free from monomeric, oligomeric or polymeric starting compounds used for the preparation of the crosslinkable polymer or from by-products formed during the preparation of the crosslinkable polymer, and is used without addition of a comonomer, and wherein the crosslinking is initiated by actinic radiation.

6. A process according to claim 5, wherein the moulding is a contact lens.

7. A process according to claim 6 for the production of a contact lens, wherein the essentially aqueous solution is a purely aqueous solution or a solution in an artificial buffered tear fluid.

8. A moulding obtained by a process according to claim 1.

9. A process according to claim 1, wherein the crosslinkable polymer or the aqueous solution is purified before introducing it to the mould to remove monomeric, oligomeric or polymeric starting compounds used for the preparation of the crosslinkable polymer and by-products formed during the preparation of the crosslinkable polymer.

10. A process according to claim 9, wherein the crosslinkable polymer is purified by ultrafiltration.

11. A process according to claim 1, wherein the crosslinkable polymer is a polyvinyl alcohol having a mean molecular weight of at least 2000 which comprises from 0.5 to 80%, based on the number of hydroxyl groups in the polyvinyl alcohol, of units containing crosslinkable ethylenically unsaturated groups and units containing the bonded photoinitiator.

12. A process according to claim 11, wherein the units containing crosslinkable ethylenically unsaturated groups are of the formula

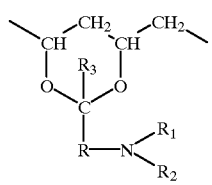

(I)

in which R is alkylene having up to 12 carbon atoms, $R_1$ is hydrogen or $C_1$–$C_7$alkyl, $R_2$ is an olefinically unsaturated, electron-withdrawing, crosslinkable radical having up to 25 carbon atoms, and $R_3$ is hydrogen, a $C_1$- to $C_6$alkyl group or a cycloalkyl group.

13. A process according to claim 11, wherein the units containing the bonded photoinitiator are of the formula

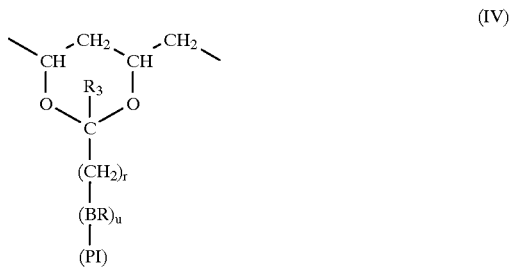

(IV)

in which

BR is an —NH—CO—$(CH_2)_o$— or —$NR_7$—$(CH_2)_r$— bridge or a quaternary salt thereof which has

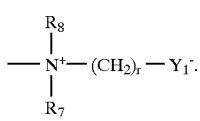

PI is the radical of a photoinitiator selected from the group consisting of benzoins, acetophenones, benzil, benzil ketals, anthraquinones, benzophenones, thioxanthones, xanthones; acridines, phenazines, quinoxalines, 1-aminophenyl ketones and 1-hydroxyphenyl ketones, $Y^-$ is a counterion, $R_3$ is hydrogen, a $C_1$–$C_6$alkyl group or a cycloalkyl group, $R_7$ is hydrogen; or linear or branched $C_1$–$C_{12}$alkyl which is unsubstituted or substituted by $C_1$–$C_4$alkoxy; a —$(CH_2)_r$-PI group; a —CO—$R_{13}$ group, in which $R_{13}$ is linear or branched $C_1$–$C_6$alkyl which is unsubstituted or substituted by —COOH or acrylamide; or an unsubstituted, linear or branched radical of a $C_3$–$C_8$olefin, $R_8$ is hydrogen or unsubstituted or $C_1$–$C_4$alkoxy-substituted, linear or branched $C_1$–$C_4$alkyl so long as $R_7$ is not —CO—$R_{13}$, m is 0 or 1, n is a number from 1 to 12, o is a number from 1 to 6, and r is a number from 2 to 6, with the proviso that if the BR bridge is a quaternary salt, n is a number from 2 to 12, and —$R_7$ is —CO—$R_{13}$ when n=1.

14. A process according to claim 13 wherein PI is the radical of a photoinitiator of the formula

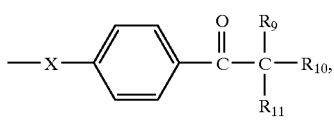

in which X is —O—, —S— or —N($R_{12}$)—, $R_9$ is unsubstituted or phenyl-substituted linear or branched $C_1$–$C_6$alkyl, linear or branched $C_1$–$C_6$alkoxy, a 6-membered carbocyclic or heterocyclic ring, or an unsubstituted linear or branched radical of a $C_3$–$C_8$olefin, $R_{10}$ is a group of the formula —$OR_{14}$ or

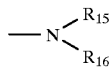

or phenyl, $R_{11}$ is unsubstituted or phenyl-substituted linear or branched $C_1$–$C_6$alkyl, linear or branched $C_1$–$C_6$alkoxy, a 6-membered carbocyclic or heterocyclic ring, an unsubstituted, linear or branched radical of a $C_3$–$C_8$olefin, or phenyl, or $R_9$ and $R_{11}$ together form a 5- or 6-membered carbocyclic ring, $R_{12}$ is hydrogen or linear or branched $C_1$–$C_4$alkyl, $R_{14}$ is hydrogen or linear or branched $C_1$–$C_4$alkyl, $R_{15}$ and $R_{16}$, independently of one another, are linear or branched $C_1$–$C_4$alkyl, or $R_{15}$ and $R_{16}$ together form a 5- or 6-membered heterocyclic ring.

15. A crosslinkable polymer which is a derivative of a polyvinyl alcohol having a molecular weight of at least about 2000 which comprises from about 0.5 to about 80%, based on the number of hydroxyl groups in the polyvinyl alcohol, of units containing crosslinkable olefinically unsaturated groups, and units containing a bonded photoinitiator selected from the group consisting of benzoins, acetophenones, benzil, benzil ketals, anthraquiones, benzophenones, thioxanthones, xanthones, acridines, phenazines, quinoxalines, 1-aminophenyl ketones and 1-hydroxyphenyl ketones.

16. A crosslinkable polymer according to claim 15, wherein the units containing crosslinkable groups are units of the formula I

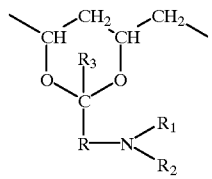

(I)

in which R is alylene having up to 12 carbon atoms, $R_1$ is hydrogen or lower alkyl, $R_2$ is an olefinically unsaturated, electron-withdrawing, crosslinkable radical, and $R_3$ is hydrogen, a $C_1$- to $C_6$ alkyl group or a cycloalkyl group.

17. A crosslinkable polymer according to claim 16, in which $R_2$ is an olefinically unsaturated acyl radical of the formula $R_4$—CO—, in which $R_4$ is an olefinically unsaturated, crosslinkable radical having 2 to 24 carbon atoms.

18. A crosslinkable polymer according to claim 17, in which $R_4$ is alkenyl having 2 to 8 carbon atoms.

19. A crosslinkable polymer according to claim 16, in which the radical $R_2$ is a radical of the formula II —CO—NH—$(R_5$—NH—CO—O$)_q$—$R_6$—O—CO—$R_4$  (II)

in which q is zero or one, and $R_5$ and $R_6$, independently of one another, are lower alkylene having 2 to 8 carbon atoms, arylene having 6 to 12 carbon atoms, a saturated bivalent cycloallphatic group having 6 to 10 carbon atoms, arylenealkylene or alkylenearyiene having 7 to 14 carbon atoms or aryienealkylenearylene having 13 to 16 carbon atoms, and in which $R_4$ is an olefinically unsaturated, copolymerizable radical having 2 to 24 carbon atoms.

20. A crosslinkable polymer according to claim 16, wherein the units containing a crosslinkable group are units of the formula III

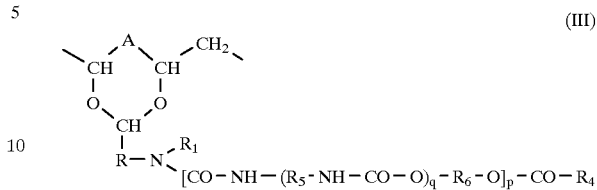

(III)

in which R is alkylene having up to 12 carbon atoms, $R_1$ is hydrogen or lower alkyl, p has the value zero or one, q has the value zero or one, $R_4$ is an olefinically unsaturated, crosslinkable radical having 2 to 8 carbon atoms, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms.

21. A crosslinkable polymer according to claim 17, in which R is lower alkylene having up to 6 carbon atoms, p is zero and $R_4$ is alkenyl having 2 to 8 carbon atoms.

22. A crosslinkable polymer according to claim 17, in which R is lower alkylene having up to 6 carbon atoms, p is one, q is zero, $R_6$ is lower alkylene having 2 to 6 carbon atoms, and $R_4$ is alkenyl having 2 to 8 carbon atoms.

23. A crosslinkable polymer according to claim 17, in which R is lower alkylene having up to 6 carbon atoms, p is one, q is one, $R_5$ is lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene, or phenylene(lower alkylene)phenylene, $R_6$ is lower alkylene having 2 to 6 carbon atoms, and $R_4$ is alkenyl having 2 to 8 carbon atoms.

24. A crosslinkable polymer according to claim 12, wherein the units containing a bonded photoinitiator are units of the formula IV

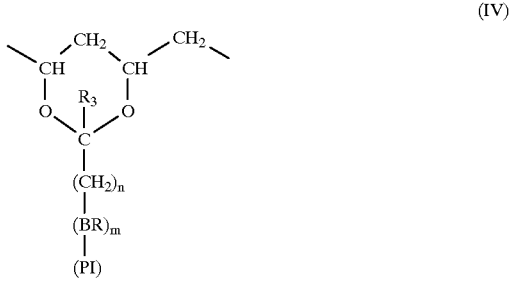

(IV)

in which

BR is an

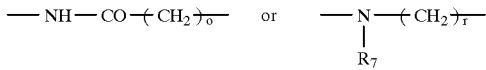

bridge or a quaternary salt thereof which has the formula $$-\overset{\oplus}{\underset{\underset{R_7}{|}}{\overset{\overset{R_8}{|}}{N}}}-(CH_2)_{\overline{r}}\cdot Y^{\ominus},$$

PI is the radical of a photoinitiator, in particular of the formula V $$-X-\underset{}{\underset{}{\bigcirc}}-\overset{O}{\underset{||}{C}}-\overset{R_9}{\underset{\underset{R_{11}}{|}}{C}}-R_{10}$$

in which

X is —O—, —S— or —N($R_{12}$)—,

Y is a counterion, such as $H_2SO_4^{\ominus}$, $F^{\ominus}$, $Cl^{\ominus}$, $Br^{\ominus}$, $I^{\ominus}$, $CH_3COO^{\ominus}$, $OH^{\ominus}$, $BF_4^{\ominus}$ or $H_2PO_4^{\ominus}$, $R_3$ is hydrogen, a $C_1$–$C_6$alkyl group or a cycloalkyl group, $R_7$ is hydrogen; unsubstituted or substituted, linear or branched $C_1$–$C_{12}$alkyl; the —(CH$_2$)$_r$—PI group or the —CO—$R_{13}$ group, in which $R_{13}$ is linear or branched $C_1$–$C_6$alkyl which is unsubstituted or substituted by —COOH or acrylamide, or an unsubstituted, linear or branched radical of a $C_3$–$C_8$olefin, $R_8$ is hydrogen or unsubstituted or substituted, linear or branched $C_1$–$C_4$alkyl so long as $R_7$ is not —CO—$R_{13}$, $R_9$ is unsubstituted or substituted, linear or branched $C_1$–$C_6$alkyl, unsubstituted or substituted, linear or branched $C_1$–$C_6$alkoxy, a 6-membered carbocyclic or heterocyclic ring, or an unsubstituted linear or branched radical of a $C_3$–$C_8$olefin, $R_{10}$ is a group of the formula —O$R_{14}$ or $$-N\begin{matrix} \diagup R_{15} \\ \diagdown R_{16} \end{matrix}$$

or aryl, $R_{11}$ is unsubstituted or substituted, linear or branched $C_1$–$C_6$alkyl or $C_1$–$C_6$alkoxy, a 6-membered carbocyclic or heterocyclic ring, an unsubstituted, linear or branched radical of a $C_3$–$C_8$olefin, or aryl, where $R_9$ and $R_{11}$ together can also be cyclized to form a 5- or 6-membered carbocyclic ring, $R_{12}$ is hydrogen or unsubstituted, linear or branched $C_1$–$C_4$alkyl, $R_{14}$ is hydrogen or unsubstituted or substituted, linear or branched $C_1$–$C_4$alkyl, $R_{15}$ and $R_{16}$, independently of one another, are unsubstituted, linear or branched $C_1$–$C_4$alkyl, or $R_{15}$ and $R_{16}$ are bonded together to form a 5- or 6-membered heterocyclic ring, m is 0 or 1, n is a number from 1 to 12, o is a number from 1 to 6, and r is a number from 2 to 6, where substituted radicals are substituted, in particular, by $C_1$–$C_4$alkyl or by $C_1$–$C_4$alkoxy, with the following provisos:

if the BR bridge is a quaternary salt, n is a number from 2 to 12;

$R_{14}$ is not hydrogen if $R_9$ is a $C_1$–$C_6$alkoxy radical; and $R_7$ is —CO—$R_{13}$ when n=1.

25. A crosslinkable polymer according to claim 24, wherein the units containing a bonded photoinitiator conform to the formula IVA, IVB or IVC (IVA)

(IVB)

-continued (IVC)

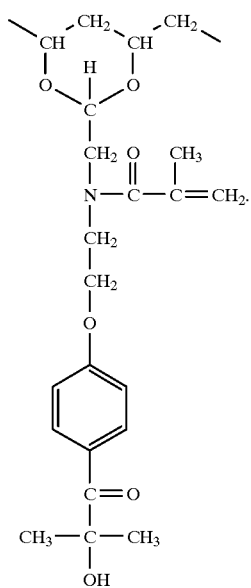

26. A crosslinkable polymer according to claim 12, wherein the crosslinkable polymer further comprises units which contain acidic groups and conform to the general formula VII

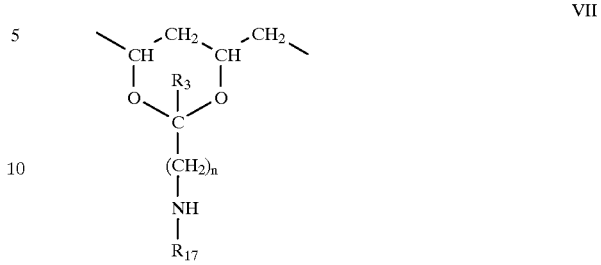

VII in which $R_3$ is hydrogen, a $C_1$- to $C_6$alkyl group or a cycloalkyl group, n is a number from 1 to 12, and $R_{17}$ is the radical of a monobasic, dibasic or tribasic, saturated or unsaturated, aliphatic or aromatic organic acid or sulfonic acid.

27. A crosslinkable polymer according to claim 15, which is a derivative of a polyvinyl alcohol having a molecular weight of at least about 2000 which comprises a total of from about 0.5 to about 25%, based on the number of hydroxyl groups in the polyvinyl alcohol, of units containing crosslinkable groups, and units containing a bonded photoinitiator.

* * * * *